United States Patent
Ward

(10) Patent No.: US 7,125,929 B2
(45) Date of Patent: Oct. 24, 2006

(54) ADHESIVE COMPOSITION HAVING IMPROVED CLARITY FOR COEXTRUDED BARRIER FILMS

(75) Inventor: Daniel R. Ward, Maineville, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/842,924

(22) Filed: May 11, 2004

(65) Prior Publication Data

US 2005/0256263 A1 Nov. 17, 2005

(51) Int. Cl.
*C08G 63/48* (2006.01)

(52) U.S. Cl. .................. 525/70; 264/176.1; 264/219; 428/411.1; 428/412

(58) Field of Classification Search .......... 264/176.1, 264/219; 428/411.1, 412; 525/70
See application file for complete search history.

(56) References Cited

U.S. PATENT DOCUMENTS

| | | | |
|---|---|---|---|
| 4,762,882 A | | 8/1988 | Okano et al. |
| 5,525,672 A | * | 6/1996 | Jones ................ 525/80 |
| 5,534,472 A | | 7/1996 | Winslow et al. |
| 5,643,999 A | * | 7/1997 | Lee et al. ........... 525/193 |
| 5,733,980 A | * | 3/1998 | Cozewith et al. ....... 525/314 |
| 6,171,993 B1 | | 1/2001 | Mavridis et al. |
| 6,177,516 B1 | | 1/2001 | Hudak |
| 6,329,465 B1 | * | 12/2001 | Takahashi et al. ........ 525/191 |
| 6,514,583 B1 | * | 2/2003 | Ahlgren et al. .......... 428/34.9 |
| 6,838,520 B1 | * | 1/2005 | Etherton ................ 525/191 |
| 2004/0242778 A1 | | 12/2004 | Etherton |
| 2004/0249071 A1 | * | 12/2004 | McFaddin et al. ........ 525/70 |

FOREIGN PATENT DOCUMENTS

| | | |
|---|---|---|
| EP | 0 479 457 A1 | 8/1992 |
| EP | 0 896 044 A1 | 10/1999 |

OTHER PUBLICATIONS

Mirabella, F., et al.: "Morphological Explanation of the Extraordinary Fracture Toughness of Linear Low Density Polyethylene," *J. Polymer Science: Part B: Polymer Physics*, vol. 26, No. 9 (Aug. 1988), pp. 1995-2005.
R. Shroff, et al.: "New Measures of Polydispersity from Rheological Data on Polymer Melts," *J. Applied Polymer Science*, vol. 57, (1995), pp. 1605-1626.
Waller, Paul: "Melt Fracture or Interfacial Instability? Different Ills Needs Different Cures." Extrusion Troubleshooter, www.plasticstechnology.com (Mar. 2003) pp. 39 & 41.
Zimmerman, D.A.: "The Effect of the Tie-Layers on Optical Properties of Coextruded Multilayer Films" *ANTEC 2000 Plastics: The Magical Solution*, vol. 2; p. 311 (4 pages).

* cited by examiner

*Primary Examiner*—Terressa Boykin
(74) *Attorney, Agent, or Firm*—Gerald A. Baracka; William A. Heidrich

(57) ABSTRACT

Adhesive compositions useful for adhering barrier resins are provided. The adhesives are a blend of ethylene-a-olefin copolymer base resin having hard and soft phases which form a network structure and a functionally modified ethylene-α-olefin copolymer.

15 Claims, No Drawings

ADHESIVE COMPOSITION HAVING IMPROVED CLARITY FOR COEXTRUDED BARRIER FILMS

BACKGROUND OF THE INVENTION

1. Field of the Invention

The invention relates to adhesive compositions useful as tie-layers for coextruded barrier films. The adhesive compositions which provide improved clarity are blends of an ethylene-α-olefin copolymer base resin having hard and soft phases that form a network structure and an ethylene-α-olefin copolymer grafted with an ethylenically unsaturated carboxylic acid or carboxylic acid derivative. The invention also relates to multi-layer barrier film constructions having improved clarity obtained using the improved adhesive blends.

2. Description of the Prior Art

Multi-layer films are widely used in the packaging industry. Depending on the intended end-use application of the film, the number and arrangement of the various layers as well as the types of polymer resins employed will vary. Polymer resins used include a wide variety of polar and non-polar polymers selected for their ability to provide essential properties such as structural integrity, puncture resistance, abrasion resistance, etc. Resins having barrier properties are generally included as a barrier layer to prevent the passage of oxygen and moisture in multi-layer constructions used for food packaging. Commonly used resins for these applications include polyethylenes, ethylene-vinyl acetate (EVA) copolymers, ethylene-vinyl alcohol (EVOH) copolymers, nylons and the like.

To facilitate adhesion of layers of dissimilar polymer resins, adhesive layers referred to as tie-layers, are employed. The tie-layers are generally mixtures of functionalized polyolefins, i.e., having polar functionality grafted onto the polymer backbone, and non-functionalized polyolefins. While various tie-resin compositions are known to effectively adhere polyethylene to EVOH or nylon this is often accompanied by an undesirable decrease in film clarity generally believed to be the result of interfacial distortion caused by the reaction of the functionality of the tie resin with the functional groups of the EVOH or nylon barrier resin. While the adhesive bond strength is directly proportional to the number of bonds formed at the tie-EVOH (or nylon) interface, this same bonding effectively amplifies shear stresses caused by viscosity differences between the tie resin and barrier resin. The phenomena can be observed by coextruding linear low density polyethylene (LLDPE) and EVOH film and adding increasing amounts of grafted maleic anhydride (MAH) to the LLDPE. As the amount of the grafted MAH increases, there is a corresponding increase in adhesion and interfacial distortion, i.e., reduction in film clarity. This occurs even though the viscosity of the LLDPE does not significantly change as the grafted MAH is added. The degree of interfacial distortion is determined using Narrow Angle Light Scattering techniques (ASTM D1746-03).

Ethylene copolymers having a network structure are disclosed in U.S. Pat. No. 6,171,993. U.S. Pat. No. 6,177,516 discloses adhesive blends containing 35 to 95 weight percent ethylene copolymer having a network structure and 5 to 65 weight percent modified polyolefin containing acid or acid derivative functionality. The adhesive blends, which preferably additionally contain 7 to 35 weight percent of an elastomeric homopolymer or copolymer, are primarily utilized as tie-layers to adhere multi-layer constructions subjected to high stress/high demand conditions where it is observed the compositions retain their adhesive strength and resist delamination for extended periods.

It would be highly advantageous if adhesive compositions suitable for use as tie-layers to bond barrier polymers, such as nylon and EVOH, and which provide improved clarity were available. It would be even more advantageous if the adhesive compositions exhibited improved clarity in coextruded barrier films while maintaining acceptable adhesion. These and other advantages are obtained with the compositions of the invention which are described in more detail to follow.

SUMMARY OF THE INVENTION

The present invention relates to adhesive compositions suitable for use as tie-layers for barrier resins. They are particularly advantageous for use in the production of coextruded multi-layer barrier films such as those used for food packaging. The adhesive compositions make it possible to produce multi-layer barrier films with improved clarity. More specifically the tie-layer adhesive compositions of the invention are comprised of 95 weight percent or more, based on the weight of the composition, ethylene-$C_{4-8}$ α-olefin copolymer base resin having hard and soft phases that form a network structure and a density of 0.925 g/cm$^3$ or less, and less than 5 weight percent, based on the weight of the composition, modified polyolefin which is an ethylene-$C_{3-8}$ α-olefin copolymer having a density of 0.905 to 0.965 g/cm$^3$ grafted with 0.5 to 2.5 weight percent ethylenically unsaturated carboxylic acid or ethylenically unsaturated carboxylic acid derivative. In an especially useful embodiment the base resin is an ethylene-hexene-1 copolymer having a melt index from 0.5 to 2.5 g/10 min.

The modified polyolefin is preferably an ethylene-α-olefin copolymer grafted with maleic anhydride and especially useful compositions utilize maleic anhydride grafted HDPE resins having melt indexes from 0.5 to 20 g/10 min and densities from 0.945 to 0.965 g/cm$^3$.

The adhesive compositions are particularly useful for bonding multi-layer constructions containing one or more EVOH or nylon barrier layer. Multi-layer films obtained using extrusion and coextrusion processes and comprising EVOH or nylon adhesively bonded to the tie-layer adhesive compositions of the invention are also provided. In another highly useful embodiment the multi-layer barrier films also comprise one or more polyolefin resin layers wherein the tie-layer adhesive is disposed on one or both sides of the barrier resin layer and between the barrier resin layer and the polyolefin resin layer.

DETAILED DESCRIPTION

The tie-layer adhesive compositions of the present invention are comprised of a major proportion, typically 80 weight percent or more, of a linear low density ethylene-α-olefin copolymer (LLDPE) having a network structure and less than 5 weight percent of a functionalized polyolefin. Small amounts, up to about 15 weight percent, of other polyolefins may optionally be included but are not necessary to achieve the improved properties.

When used herein, the term base resin refers to the ethylene-α-olefin copolymer. The functionalized polyolefin is also referred to herein as the modified polyolefin or graft component. Unless otherwise specified, all percentages are weight percentages based on the total weight of the composition. Melt index (MI) values are determined in accordance with ASTM D 1238-01, condition 190/2.16. Densities are determined in accordance with ASTM D 1505.

LLDPE base resins used for the tie-layer adhesive blends of the invention have a network structure. For the purpose of this invention, polymers having a network structure are ethylene copolymers which contain hard and soft phases. The soft rubber phase is characterized as being an ethylene/comonomer rubber which is highly branched, i.e., contains from about 35 to 65 alkyl branches per 1000 total carbon atoms. The hard phase is ethylene homopolymer or copolymer with low branching content, i.e., alkyl branch contents per 1000 total carbon atoms less than 35. The network structure is believed to be formed, at least in part, by the association of these hard and soft phases in a manner which imparts unique melt elastic properties to the resin. As a result of the network structure created by the interaction of the hard and soft phases, the LLDPE copolymers exhibit unusual melt elastic behavior and improved resin properties. Ethylene copolymers having a network structure and processes by which they are characterized and prepared are described in U.S. Pat. No. 6,171,993 which is incorporated herein by reference.

The ethylene copolymer base resins are prepared in-situ, i.e., they are reactor-made products, obtained by copolymerizing ethylene and at least one other $C_{4-8}$ α-olefin in the presence of a polymerization catalyst, cocatalyst and, optionally cocatalyst modifier. Copolymers or mixtures of copolymers obtained by the copolymerization of ethylene and hexene-1 are particularly useful base resins for the compositions of the invention. It is particularly advantageous when the copolymers contain 5 percent or more and, more preferably 5 to 20 percent hexene-1 and have a density of 0.925 g/cm$^3$ or below and, more preferably, from 0.910 g/cm$^3$ to 0.920 g/cm$^3$. MIs of the copolymer will range from 0.5 to 5.0 g/10 min and, more preferably, from 0.5 to 2.5 g/10 min. The network structure of the LLDPE copolymers is evidenced by unique rheological behavior upon low shear modification or solution dissolution, namely, when in pelletized form they exhibit a reduction in melt elasticity (ER) of 10 percent or more to a final ER value of 1.0 or less upon rheometric low shear modification or solution dissolution.

The amount of rubber phase in the ethylene copolymer base resin is typically about 15 volume percent or greater as measured by Scanning Electron Microscopy (SEM). This technique involves treating a compression molded sample to remove any rubbery, amorphous or low crystallinity polymer from the specimen surface to leave definable cavities which are then statistically analyzed by photomicrography. The technique for SEM determinations of rubber-phase content is described in an article by F. Mirabella, et al., entitled, "Morphological Explanation of the Extraordinary Fracture Toughness of Linear Low Density Polyethylenes," *J. Polymer Science: Part B: Polymer Physics*, Vol. 26, No. 9, August 1988, pp. 1995–2005.

The presence of a network structure in the LLDPE base resin is verified by the fact that the copolymer exhibits a reactor-made-to-pellet ER increase which is reversible, i.e., reduced, upon rheometric low shear modification. ER is a measure of the elasticity or the polydispersity of the ethylene copolymer which is derived from rheological data on the polymer melts, see the article to Shroff, et al., entitled "New Measures of Polydispersity from Rheological Data on Polymer Melts," *J. Applied Polymer Science*, Vol. 57, pp. 1605–1626 (1995). Reactor-made denotes powder, slurry or solution forms of the polymer resin which are formed in a polymerization vessel prior to melt processing.

In addition to exhibiting the above melt elastic behavior, the pelletized form of the ethylene copolymer exhibits a decrease in melt elasticity when dissolved in an organic solvent such as xylene. The solution dissolution ER value is nearly the same as that of the original reactor-made material. The term solution dissolution indicates that the pelletized form of the ethylene copolymer resin can be dissolved in an organic solvent such as xylene. The importance of this technique is that it allows a means for estimating the ER value of the original reactor-made material if the same is not available.

ER values are calculated from rheological data generated by measuring dynamic rheology in the frequency sweep mode, as described in ASTM 4440-95a. A Rheometrics ARES rheometer was used, operating at 150° C., in the parallel plate mode in a nitrogen environment (in order to minimize sample oxidation/degradation). The gap in the parallel plate geometry was typically 1.2–1.4 mm and the strain amplitude was 10–20 percent. Preferably 10 percent strain amplitude was employed. The range of frequencies was 0.0251 to 398.1 rad/sec.

As disclosed in an article by Shroff, et al., supra, and U.S. Pat. No. 5,534,472 ER is calculated from the storage modulus (G') and loss modulus (G") data, as follows: the nine lowest frequency points are used (5 points per frequency decade) and a linear equation is fitted by least-squares regression to log G' versus log G". ER is then calculated form the following equation:

$$ER = (1.781 \times 10^{-3}) \times G', \text{ at a value of } G'' = 5000 \text{ dyne/cm}^2.$$

It is understood by those skilled in the art that nonlinearity in the log G' versus log G" plot will result in different ER values depending on the range of the data employed, which in turns relates to the range in frequency data. The procedure followed was to extend the lower end of the frequency range so that the lowermost G" value was within the range of $7 \times 10^{3-10}4$ dyne/cm$^2$. Practically speaking, this requires a lowermost frequency of 0.0398 rad/sec for 1 MI copolymer resins and 0.0251 rad/sec for 0.6 MI copolymer resins, at 150° C.

Less than 5 percent of one or more modified polyolefins containing carboxylic acid or carboxylic acid derivative functionality is combined with the LLDPE base resin. Modified polyolefins of this type are known and, most commonly, are grafted ethylene and/or propylene polymers obtained by reacting ethylenically unsaturated carboxylic acids and carboxylic acid derivatives with the polyolefin under grafting conditions. The grafting monomers, i.e., acid, anhydride or other acid derivative, are incorporated along the polyolefin backbone.

Polyolefins modified in accordance with the foregoing procedures are ethylene-$C_{3-8}$ α-olefin copolymers. Copolymers of ethylene and butene-1, hexene-1 or octene-1 obtained utilizing known polymerization processes, including metallocene and single-site polymerization processes are most commonly used. Mixtures of two or more modified ethylene copolymers may also be employed for preparation of the adhesive blends.

Carboxylic acids and carboxylic acid derivatives utilized as grafting monomers can include compounds such as acrylic acid, maleic acid, fumaric acid, citraconic acid, mesaconic acid, maleic anhydride, 4-methyl cyclohex-4-ene-1,2-dicarboxylic acid or anhydride, bicyclo(2.2.2)oct-5-ene-2,3-dicarboxylic acid or anhydride, bicyclo(2.2.1)hept-5-ene-2,3-dicarboxylic acid or anhydride, tetrahydrophthalic acid or anhydride, methylbicyclo(2.2.1) hept-5-ene-2,3-dicarboxylic acid or anhydride, nadic anhydride, methyl nadic anhydride, himic anhydride, and methyl himic anhydride. Acid anhydride derivatives which can be used to graft the polyethylene include dialkyl maleates, dialkyl fumarates, dialkyl itaconates, dialkyl mesaconates, dialkyl citraconates and alkyl crotonates. It may be desirable to use more than one grafting monomer in order to control the physical properties of the modified polyolefin product. Maleic anhydride (MAH) is a particularly useful grafting monomer.

Grafting is accomplished in accordance with known procedures, generally by heating a mixture of the polyolefin and graft monomer(s) with or without a solvent. Most typically, the grafted products are prepared by melt blending the polyolefin in the substantial absence of a solvent with the grafting monomer in a shear-imparting extruder/reactor. Twin screw extruders such as those marketed by Coperion (formerly Werner-Pfleiderer) under the designations ZSK-53, ZSK-83, ZSK-90 and ZSK-92 are especially useful for carrying out the grafting operation. A free radical generating catalyst, such as an organic peroxide, can be employed but is not necessary.

Modified polyolefins derived from ethylene-α-olefin copolymers having densities from 0.905 to 0.965 g/cm$^3$ and grafted with 0.5 to 2.5 wt. percent ethylenically unsaturated carboxylic acid or acid derivative are employed to obtain the improved compositions of the invention. In a highly useful embodiment, the ethylene-α-olefin copolymer is a high density polyethylene (HDPE) resin having a density from about 0.945 to 0.965 g/cm$^3$. In another preferred embodiment, the ethylene-α-olefin copolymer is a LLDPE resin having a density from about 0.910 to 0.930 g/cm$^3$. The LLDPE may be the same type as used for the base resin, i.e., a LLDPE having a network structure, or a conventional LLDPE resin. Particularly useful adhesive compositions are formulated using HDPE and LLDPE resins grafted with 0.75 to 2.2 percent maleic anhydride. The MI of the modified polyolefin component will most generally be in the range from about 0.5 to about 20 g/10 min.

Adhesive compositions particularly well suited for use as tie-resins for barrier films preferably contain greater than 95 percent ethylene-α-olefin copolymer base resin and less than 5 percent functionalized polyolefin. With adhesive blends formulated using conventional, i.e., non-network structured, LLDPEs, unacceptably low levels of adhesion are obtained when the functionalized polyolefin level is below 5 percent. Highly advantageous blends contain from 95.5 to 99.5 percent base resin and 0.5 to 4.5 percent functionalized polyolefin. Even more preferred adhesive compositions are comprised of 95.5 to 98.5 percent base resin and 1.5 to 4.5 percent graft modified polyolefin. It is most advantageous when these adhesive compositions have MIs from 0.3 to 5 g/10 min and, more preferably, from 0.5 to 2.5 g/10 min.

The adhesive compositions are prepared by melt mixing the base resin and modified polyolefin by any conventional means. Mixing in a Banbury mixer or twin-screw compounding extruder is especially convenient. The individual components may be dry blended prior to melt mixing or added separately to the melt mixing operation. For most applications the adhesive blends will also contain one or more stabilizing agents, such as antioxidants, thermal stabilizers, UV inhibitors and the like. The type and amount of these stabilizing agents will depend on the end use application. Additional ingredients, if employed, may be added to the mixer as the components are being melt blended or pre-incorporated with one or more of the blend components before the final melt blending operation. This latter procedure, referred to as masterbatching, is advantageously used to incorporate additives employed at low levels. Typically, the melt blended adhesive compositions are pelletized for subsequent storage and use, however, they can be used directly as obtained from the melt blending operation.

Adhesive blends produced in accordance with the invention are useful as general purpose tie resins and may be used to bond a variety of substrates. For example, they can be used to bond plastic materials, wood, glass, paper, composite materials, metals and the like to similar or dissimilar substrates. They are, however, particularly useful in applications involving the coextrusion of multi-layer barrier films where they exhibit improved clarity.

Interfacial clarity distortion is a significant problem for processors when coextruding different resins. When two molten polymers of different viscosities meet in a manifold die the viscosity mismatch causes shear stress at the interface between the two polymers. If this interfacial shear stress reaches a critical level, the interface can become uneven and give the resulting film a distorted appearance, commonly referred to within the industry as "grainy" or "orange peel." The problem is exacerbated when polymers, such as barrier and tie-resins, capable of reacting at their interface are coextruded. While the film processor can minimize the effect, e.g., by varying processing conditions or choosing polymers that have similar viscosities under their processing conditions, all of the approaches negatively impact the economics and/or other aspects of the process. In addition to possibly requiring the use of more costly raw materials and/or limiting the production rate, such changes can also adversely affect adhesion and other critical film properties. The tie-layer adhesives of the present invention provide a viable and practical alternative means of reducing interfacial clarity distortion at the tie resin/barrier resin interface.

With the adhesive compositions of the present invention, it is now possible to significantly reduce interfacial clarity distortion in multi-layer coextruded barrier film constructions. Furthermore, this can be accomplished in many instances without sacrificing adhesion. It is even more surprising that these results can be accomplished using tie-resins having lower MAH contents than heretofore considered possible.

With the adhesive compositions of the invention it is possible to achieve adhesion levels comparable to that heretofore achieved with tie-layer adhesives having significantly higher MAH contents. Furthermore, in some instances it is possible to significantly reduce interfacial clarity loss (as measured by Narrow Angle Light Scattering) at the EVOH/tie-resin interface or nylon/tie-resin compared to similar tie-resins.

The compositions of the invention can be processed by conventional means, e.g., blown film extrusion, cast film extrusion, etc., into monolayer films which can subsequently be used to laminate various substrates. More typically, however, they are coextruded with other polymers, primarily polyolefins, to form multi-layer constructions. Polyolefins which can be employed include LDPE, LLDPE, HDPE, EVA, ethylene-acrylic acid copolymers, ethylene-methacrylic acid copolymers, ethylene-acrylic acid ester copolymers, ethylene-methacrylic acid ester copolymers, ionomers and the like. In coextrusion applications, the adhesive compositions serve as tie-layers between layers of dissimilar resins which cannot be effectively bonded directly—in this case the barrier resin and the polyolefin. The same or different polyolefin can comprise one or more layers of the multi-layer construction with one or more layers of the same or different barrier resin.

The tie-layer adhesive compositions of the invention are particularly well suited for use in multi-layer barrier film constructions, i.e., multi-layer films containing one or more layers of a barrier resin such as nylon or EVOH. The EVOH and nylon layers can be obtained using any of the resins of these types known for their barrier properties. For example, in the case of nylon it could be nylon 6, nylon 6,6, nylon 6/6,6 or blends of these nylons with amorphous nylon. Multi-layer barrier films are widely used for numerous food packaging applications and in most of these applications good film clarity is an important consideration. Food packaging application include formed bags, pouches, casings, etc., for packaging meat and poultry products. They can also be used for snack foods, cereals, baking mixes, and the like. They may also have utility for cook-in packaging.

Numerous multi-layer barrier film constructions designed to meet the clarity and other requirements of various packaging applications are possible using the tie-layer adhesive compositions of the invention. Illustrative multi-layer constructions include the following where "Tie" represents the adhesive compositions of the invention and "FCL" represents a food contact layer such as LDPE, LLDPE, EVA, ethylene-acrylic acid or ester copolymer, ethylene-methacrylic acid or ester copolymer, ionomers or the like:

LDPE/Tie/Nylon/Tie/FCL
LDPE/Tie/EVOH/Tie/FCL
LLDPE/Tie/EVOH/Tie/FCL
LLDPE/Tie/Nylon/Tie/FCL
HDPE/Tie/EVOH/Tie/FCL
HDPE/Tie/Nylon/Tie/FCL
Nylon/Tie/Nylon/Tie/FCL
Nylon/Tie/EVOH/Tie/FCL
Nylon/EVOH/Nylon/Tie/Nylon/Tie/FCL
Nylon/EVOH/Tie/EVOH/Tie/PE/FCL Some commonly used sealable film constructions include:
Nylon/EVOH/Tie/EVOH/Tie/PE/Sealant
LLDPE/Tie/EVOH/Tie/Sealant
HDPE/Tie/Nylon/Tie/Sealant
HDPE/Tie/EVOH/Tie/Sealant where the sealant layer is EVA, LLDPE or ionomer.

All of the above constructions wherein a barrier resin is bonded to a layer of dissimilar resin will benefit from the use of the adhesive blends of the invention as the tie-layer. It will, however, be understood by those skilled in the art that, as far as clarity considerations are concerned, the clarity of the film can be no better than the clarity of the least clear film resin used. For example, HDPE is recognized to have poorer clarity than LLDPE and when it is used as one of the layers in a multi-layer construction, it will limit the clarity of the overall construction.

The following examples illustrate the invention; however, those skilled in the art will recognize numerous variations which are within the spirit of the invention and scope of the claims.

Adhesive tie-layer compositions utilized in the examples, including the compositions provided for comparative purposes, were pelletized prior to use. This was accomplished by dry blending all of the components and then melt blending the mixture in a twin screw extruder equipped with a multi-hole (⅛ inch diameter) die connected to a strand cutter.

To evaluate clarity and adhesion, 5 mil thick, 8 inch wide multilayer cast films were prepared using the adhesive blends. The films were five-layer coextruded constructions comprised as follows:

| 43% skin | 4% tie | 6% core | 4% tie | 43% skin |
| --- | --- | --- | --- | --- | where the core layer is an EVOH barrier resin and the skin is a polyolefin resin. The 5-layer films were obtained using a Killion laboratory scale film line with three 1 inch extruders in a A/B/C/B/A feedblock configuration. Melt temperatures of all of the extrudates was 420° F. The film was extruded using a 10 inch flat die to produce a continuous 8 inch wide film sample.

EXAMPLE 1

An adhesive blend was prepared in accordance with the invention which consisted of 96.5 percent LLDPE base resin having a network structure and 3.5 percent functionalized polyolefin. The LLDPE base resin was an ethylene-hexene-1 copolymer (hexene-1 content of about 11 weight percent; MI 1.1 g/10 min; density 0.916 g/cc$^3$) having a network structure as evidenced by its ability to undergo a reduction in melt elasticity (ER) of greater than 10 percent upon rheometric low shear modification. Upon low shear modification of the pelletized resin, the ER was reduced from 1.1 to 0.8—a 27 percent decrease. The functionalized polyolefin used was a HDPE resin (ethylene-hexene-1 copolymer); MI 6.5 g/10 min; density 0.953 g/cm$^3$) grafted with 1.65 percent maleic anhydride. The MI of the adhesive blend was 1.1 g/10 min.

EXAMPLE 2

A 5-layer EVA/tie/EVOH/tie/EVA cast film was prepared and evaluated for film clarity in accordance with ASTM D 1746-03. This test method is principally intended for use with nominally clear and colorless thin plastic sheeting and measures the transparency of the sheet in terms of regular transmittance. The tie-layer adhesive used was the composition of Example 1. The EVA (ethylene-vinyl acetate copolymer) resin used had a vinyl acetate content of 9 percent and MI of 1.0 g/10 min. The EVOH used (SOARNOL DC3203) contained 32 mole percent ethylene and had an MFR of 3.0 g/10 min (ASTM D 1238-01, condition 210/2.16. The resulting film had a clarity of 36 percent. For most clear film applications an NAS clarity of 25 percent is considered to be acceptable and values greater than 35 percent are considered to be superior. Adhesion values for the films were not determined since the films elongated more than 300% before separation of the tie/EVOH interface, a condition under which bond adhesion results are considered to be inaccurate.

EXAMPLE 3

Five-layer HDPE/tie/EVOH/tie/HDPE cast film was prepared in accordance with the above-described procedure using the tie-layer adhesive of Example 1. The EVOH resin used was the same as in Example 2. The HDPE used for the skin layer was an ethylene-butene-1 copolymer having a MI of 6.5 g/min and density of 0.953 g/cm$^3$. The resulting film was evaluated for adhesion using a standard T-peel test procedure. For the T-peel adhesion test, 1-inch wide strips of film were cut along the machine direction and one of the HDPE surfaces scored and pulled along the transverse direction to initiate delamination between a tie-layer/EVOH interface. The separated ends were then connected to the jaws of an Instron tester and pulled at a rate of 10 inches/minute and the average force (three replicates) determined. An average force of 2.5 lbs/inch was required to separate the tie-layer/EVOH layer. When the amount of functionalized polyolefin in the tie-layer adhesive blend was increased to 4%, the adhesive strength was increased to 2.8 lbs/inch.

EXAMPLE 4

Following the procedure of Example 1, two additional tie-layer adhesive compositions were prepared. The LLDPE base resin and functionalized polyolefin used were the same as in Example 1 except that the amount of the functionalized polyolefin component was reduced. The two adhesive blends, identified as 4A and 4B had the following compositions:

4A: 98% base resin/2% functionalized polyolefin
4B: 97% base resin/3% functionalized polyolefin Five layer films were prepared as described in Example 2 using each of the above-described tie-layer adhesives and evaluated for clarity. NAS clarity values were 40% for the barrier film prepared using 4A and 34% for the film which used 4B as the tie-layer adhesive. It is apparent from the above results that even better clarity is obtained when the amount of functionalized polyolefin in the blend is reduced.

EXAMPLE 5 AND COMPARATIVE EXAMPLE 6

An adhesive composition of the invention was prepared in accordance with the procedure of Example 1 and contained 96% LLDPE having a network structure and 4% functionalized polyolefin (HDPE grafted with 1.65% MAH). For comparative purposes, a blend containing 4% of the functionalized polyolefin and 96% of a conventional LLDPE resin was also prepared. The LLDPE used for the comparative blend was an ethylene-butene-1 copolymer and had a MI of 1.2 g/10 min and density of 0.918 g/cm³ but did not have a network structure. Five layer films were prepared and evaluated for adhesion as described in Example 3. The film prepared using the adhesive blend of the invention (Example 5) had an adhesive strength of 2.8 lbs/inch whereas the adhesive strength of the identically prepared film obtained using the comparative adhesive blend only had an adhesive strength of 0.6 lbs/inch which is considered to be unacceptable for virtually all commercial applications. EVA/barrier films were not prepared and evaluated for clarity using the comparative adhesive blend in view of the unacceptable adhesion; however, NAS clarity of EVA/barrier film obtained using the adhesive blend of the invention was 31%.

EXAMPLE 6

To demonstrate the ability to use the adhesive compositions of the invention to obtain multi-layer blown films having good clarity the following example is provided. For this example blown films having the structure:

LLDPE/LLDPE/Tie/EVOH/Tie/Sealant and suitable for packaging certain meat and cheese products were prepared using the tie-layer adhesive of Example 1. The LLDPE resins used were both ethylene-butene copolymers. The EVOH was the same as used in Example 2 and the sealant layer was mLLDPE (ethylene-butene-1 copolymer; MI 2.0 g/10 min; density 0.916 g/cm³). The film was manufactured on a W&H blown film line having six 1.5 inch extruders and an 18-inch diameter die. Film thickness was 2.0 mils and had approximate layer ratios of 50% LLDPE/5% tie/15%EVOH/5% tie/25% mLLDPE.

The resulting film had an NAS clarity of 25% and the tie/EVOH layers could not be separated, i.e., the film elongated more than 300% before separation of the adhesive bond.

I claim:

1. A tie-layer adhesive composition comprising:
  (a) 95.5 to 99.5 weight percent, based on the weight of the composition, ethylene-$C_{4-8}$ α-olefin copolymer base resin having hard and soft phases that form a network structure, density of 0.925 g/cm³ or less, melt index from 0.3 to 5 g/10 min and which, when in the pelletized form, exhibits a reduction in ER of 10 percent or more to a final ER value of 1.0 or less upon rheometric low shear modification or solution dissolution, and
  (b) 0.5 to 4.5 weight percent, based on the weight of the composition, modified polyolefin which is an ethylene-$C_{3-8}$ α-olefin copolymer having a density of 0.905 to 0.965 g/cm³ grafted with 0.5 to 2.5 weight percent ethylenically unsaturated carboxylic acid or ethylenically unsaturated carboxylic acid derivative.

2. The adhesive composition of claim 1 having a melt index from 0.5 to 5 g/10 min and wherein the modified polyolefin (b) is an ethylene-α-olefin copolymer grafted with maleic anhydride.

3. The adhesive composition of claim 2 wherein (a) is a copolymer of ethylene and hexene-1 having a melt index of 0.5 to 2.5 g/10 min.

4. The adhesive composition of claim 3 wherein (a) has a density of 0.910 to 0.920 g/cm³ and melt index of 0.5 to 1.5 g/10 min.

5. The adhesive composition of claim 2 wherein (b) is a grafted high density polyethylene copolymer having a melt index from 0.5 to 20 g/10 min and density from 0.945 to 0.965 g/cm³.

6. The adhesive composition of claim 5 wherein (b) is grafted with 0.75 to 2.2 weight percent maleic anhydride and has a melt index from 4.5 to 8 g/10 min.

7. The adhesive composition of claim 2 wherein (b) is a grafted linear low density polyethylene copolymer having a melt index from 0.5 to 20 g/10 min and density from 0.910 to 0.930 g/cm³.

8. The adhesive composition of claim 7 wherein (b) is grafted with 0.75 to 2.2 weight percent maleic anhydride and has a melt index from 4.5 to 8 g/10 min.

9. A multi-layer barrier film comprising a barrier resin layer wherein the barrier resin is selected from the group consisting of ethylene-vinyl alcohol copolymer and nylon and adhesively bonded thereto a tie-layer adhesive composition comprising 95.5 to 99.5 weight percent, based on the weight of the composition, ethylene-$C_{4-8}$ α-olefin copolymer base resin having hard and soft phases that form a network structure, density of 0.925 g/cm³ or less, melt index from 0.3 to 5 g/10 min., and which, when in the pelletized form, exhibits a reduction in ER of 10 percent or more to a final ER value of 1.0 or less upon rheometric low shear modification or solution dissolution, and 0.5 to 4.5 weight percent, based on the weight of the composition, modified polyolefin which is an ethylene-$C_{3-8}$ α-olefin copolymer having a density of 0.905 to 0.965 g/cm³ grafted with 0.5 to 2.5 weight percent ethylemcally unsaturated carboxylic acid or ethylenically unsaturated carboxylic acid derivative.

10. The barrier film of claim 9 produced by extrusion or coextrusion processes.

11. The barrier film of claim 9 wherein the tie-layer adhesive composition has a melt index from 0.5 to 5 g/10 min and the modified polyolefin is an ethylene-α-olefin copolymer grafted with maleic anhydride.

12. The barrier film of claim 11 wherein the base resin is a copolymer of ethylene and hexene-1 and has a melt index of 0.5 to 2.5 g/10 min and the modified polyolefin is a grafted high density polyethylene copolymer having a melt index from 0.5 to 20 g/10 min and density from 0.945 to 0.965 g/cm$^3$.

13. The barrier film of claim 11 wherein the base resin is a copolymer of ethylene and hexene-1 and has a melt index of 0.5 to 2.5 g/10 min and the modified polyolefin is a grafted linear low density polyethylene copolymer having a melt index from 0.5 to 20 g/10 min and density from 0.910 to 0.930 g/cm$^3$.

14. The barrier film of claim 9 wherein the tie-layer adhesive composition is adhesively bonded to both sides of the barrier resin layer.

15. The barrier film of claim 9 comprising a further polyolefin resin layer wherein the polyolefin resin is selected from the group consisting of low density polyethylene, linear low density polyethylene, high density polyethylene, ethylene-vinyl acetate copolymer, ethylene-acrylic acid copolymer, ethylene-acrylate ester copolymer, ethylene-methacrylic acid copolymer, ethylene-methacrylic ester copolymer and ionomer and wherein the tie-layer adhesive is disposed between the barrier resin layer and said polyoloefin resin layer.

* * * * *